March 25, 1924.  1,488,369
O. VOGETZER
PRINTING MECHANISM FOR MOTION PICTURE FILMS
Filed Feb. 10, 1921   2 Sheets-Sheet 1
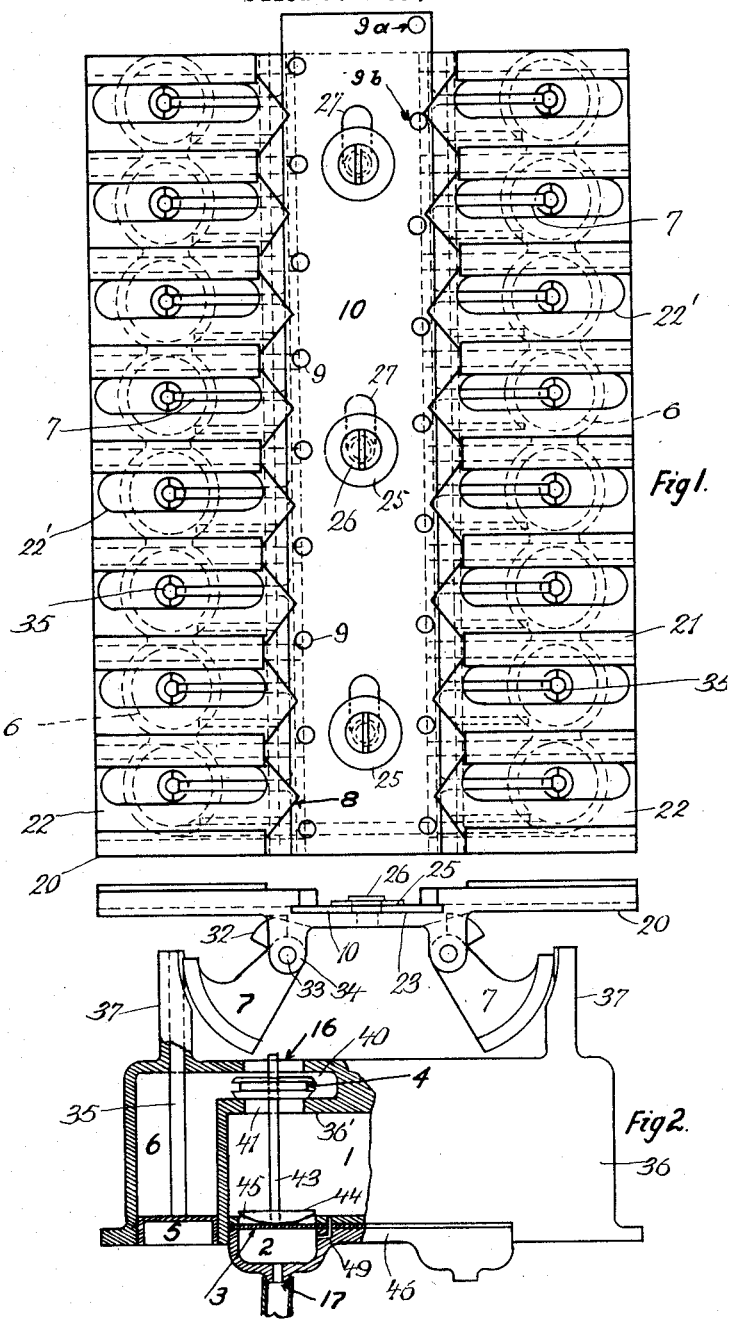
INVENTOR
Otto Vogetzer.
BY Lewis J. Doolittle
ATTORNEY March 25, 1924. 1,488,369
O. VOGETZER
PRINTING MECHANISM FOR MOTION PICTURE FILMS
Filed Feb. 10, 1921 2 Sheets-Sheet 2
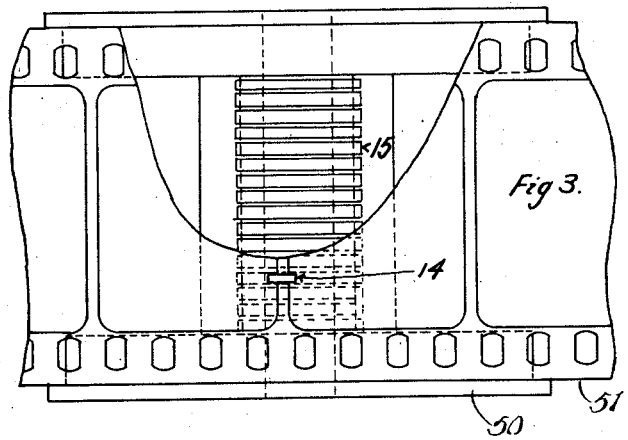
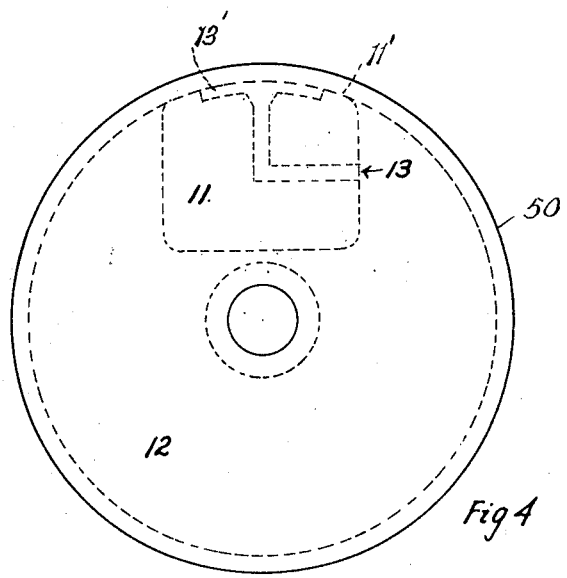
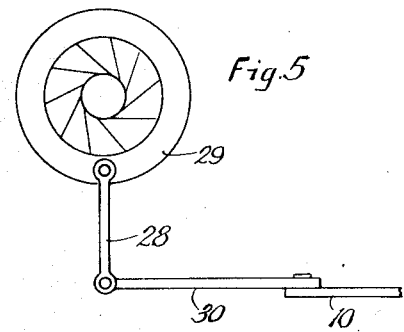
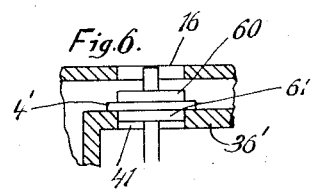
INVENTOR
Otto Vogetzer
BY Lewis J. Doolittle
ATTORNEY Patented Mar. 25, 1924.

1,488,369

UNITED STATES PATENT OFFICE.

OTTO VOGETZER, OF BROOKLYN, NEW YORK, ASSIGNOR, BY MESNE ASSIGNMENTS, TO DUPLEX MOTION PICTURE INDUSTRIES INC., A CORPORATION OF DELAWARE.

PRINTING MECHANISM FOR MOTION-PICTURE FILMS.

Application filed February 10, 1921. Serial No. 443,788.

*To all whom it may concern:*

Be it known that I, OTTO VOGETZER, a citizen of the United States, and resident of Brooklyn, in the county of Kings and State of New York, have invented certain new and useful Improvements in Printing Mechanism for Motion-Picture Films, of which the following is a specification.

This invention relates to printing mechanism for motion picture films, having more particular reference to the printing of the positives from the original or negative film.

As is well known to those familiar with this work, the amount of light needed for printing a single length of film, or "reel," very frequently varies with the different scenes which may be photographed thereon, due to varying light conditions at the times or places of photographing the various scenes. In printing machines in common use at the present time the films are mechanically fed through the machine for exposure to the light, while in certain machines means are provided whereby the intensity of the light may be automatically varied at the desired points.

The means already in use for this purpose, however, are disadvantageous in that they operate by varying the current to the lamp, and in consequence vary the quality of the light, and also in that they must be specially set for every film and can only take care of a limited number of scenes without attention or resetting.

The present invention has for a general object to overcome the above disadvantages, and, more specifically, to provide a means whereby the light variation may be effected by automatic adjustment of the usual iris with which such machines are equipped and to provide also a device which will take care of an unlimited number of scenes and does not require any initial setting.

For further comprehension of the invention, and of the objects and advantages thereof, reference will be had to the following description and accompanying drawings, and to the appended claims in which the various novel features of the invention are more particularly set forth.

Fig. 1 of the drawings is a plan view showing the portion of the device which operates to adjust the iris.

Fig. 2 is an end view thereof with parts broken away to show the interior construction.

Fig. 3 is a plan view of the portion of the device which acts in conjunction with the film to selectively cause the operation of the positioning elements shown in Fig. 1.

Fig. 4 is a side view of the part of the device shown in Fig. 3.

Fig. 5 is a fragmentary side view showing the connection between the index slide and the iris.

Fig. 6 shows a modified form of control valve.

Briefly speaking, my invention, as here embodied comprises a slide adapted for connection to the light dimming or obscuring member, a series of positioning members adapted to individually engage said slide, operating means for said positioning members including a cylinder and piston for each member, and air conduits the intake openings whereof are controlled by the film.

Referring now to Figs. 1 and 2, in the preferred embodiment of my invention I provide a table 20 having its face formed to present a plurality of guides 21 which are arranged in two series spaced along opposite sides of the table and extending transversely thereto, the inner ends of the opposed rows or series of guides being spaced some distance apart. Slidable in these guides 21 are a series of slides 22 to which further reference will presently be made.

Extending longitudinally of the table in the space between the guides 21 is a guide channel 23 in which is a slide 10, the guide channel 23 being sunk below the bottoms of the guides 21 to permit the slides in the latter projecting across the top of the slide 10. The slide 10 may be held against vertical displacement by washers 25 on screws 26 which pass through slots 27 in the slide. This slide 10, which I term the index slide, may be connected to the operating arm 28 of the usual iris 29 of the machine by a link 30.

The slides 22 are adapted to be individually reciprocated by means to be presently pointed out in detail in order to place the slide 10 in the selected position, each slide 22 placing the slide 10 in a slightly different position. To provide for operative engagement of the slides 22 with the slide 24 the inner ends thereof are evenly bevelled on opposite sides as at 8 to a point, these bevelled faces forming cams. I therefore term these slides 22 cam slides. Mounted on the face of the slide 10, are two rows of pins 9 one adjacent each side thereof, these pins being as positioned in front of the respective cam-slides 22 but at a different centre to centre spacing from that of the latter as clearly shown in Fig. 1, so that for any given position of the index slide 10 the pins will progressively vary in distance from the medium lines of the respective cam-slides 22, the difference between the centre to centre spacing of the pins and cam-slides being equal to the spacing of the different positions to which the slide 10 is to be adjusted. The pins 30 are also so proportioned in size as to leave a space therebetween corresponding to the width of the cam-slides 22. It may be said that the diameters of the pins will be equal to the spaces between the slides 22 plus or minus the above mentioned variation of centres. In the arrangement shown, the pins on the right hand side of Fig. 1 are spaced on centres greater than the spacing of the slides 22 and are therefore of larger diameter than the spaces between the latter, while the pins on the left hand side are spaced on centres smaller than the slides 22 and the pins are of smaller diameter than the spaces between the slides.

For operating the cam-slides 22 the latter are formed on their undersides with suitable racks adapted to be engaged by pinion segments 32 fixed on pintles 33 suitably carried by ears 34 depending from the table 20, these pintles having also fixed thereon the larger gear segments 7 which mesh with rack teeth formed on the projecting outer ends of piston rods 35 whose inner ends are fixed to pistons such as 5 slidable in cylinder borings or chambers 6 in a casing 36 upon which the table 20 may be suitably supported, the casing having guide elements 37 at one end of the cylinder chambers for the piston rods, while the opposite end of each cylinder chamber is open. The slides 22 are longitudinally slotted as at 22' to accommodate the gear segments 7 and piston rods 35 as they move upwardly to swing the slides forward. It will be understood, of course, that there is one piston and cylinder for each cam-slide 22 and an individual connection therebetween.

Within the casing 36 is formed a vacuum chamber 1, and it is to be understood that any suitable device may be connected thereto for producing the vacuum therein. From the tops of the cylinder chambers 6 a pair of laterally extended spaces such as 40 are formed in the casing 36 and project over the vacuum chamber 1, the wall 36' between said vacuum chamber and the spaces 40 having a series of ports such as 41 formed therein, while a registering series of ports such as 16 are formed in the outer walls of the spaces 40. Each of the ports 41 is adapted to be controlled by a disk valve 4 located in the space 40 and mounted on a valve stem 43 upon whose lower end is fixed a head 44, this head normally abutting against an elastic diaphragm 3 which covers an opening 45 in the opposite wall of the vacuum chamber 1 to that containing the opening or port, the opening 45 being of larger diameter than the opening 41. In constructing the diaphragm 3 I preferably provide a single sheet of rubber which covers all the openings 45 and is held in place by a plate 46 suitably secured on the casing 36. A pin-hole bypass 49 preferably leads through the diaphragm from the vacuum chamber 1 into each recess 2. This plate 46 is formed to present on its inner side a series of recesses 2 which register with the openings 45 into the vacuum chamber from which they are separated by the diaphragm 3.

Each of these recesses 2 is adapted to be connected by a tube or conduit 17, to the device shown in Figs. 1 and 2. This device comprises a block 11 through which extend a series of passages 13 equal in number to the cam-slides 22, these passages preferably leading downwardly from the upper face 11' of the block 11, and outwardly through the side thereof where they are adapted for connection to the tubes or conduits 17 leading to the recesses 2.

The block 11 is preferably mounted between the flanges of a sprocket wheel 50, driven in any suitable manner and adapted to have the film 51 pass thereover, the top surface of the block being curved concentric to the sprocket wheel and being flush with the toothed flange elements over which the film passes, the passages 11 being spaced along said block between said flange elements, while they are preferably elongated in the face of the block in the direction of motion of the film as at 13'.

In the use of the device the positive film 51 will have cut therein a series of short slots 14, of which there is one at each point where the light has to be changed, these slots having a varying transverse location on the film so as to register with the desired one of the passages 13. While the machine is operating a vacuum is created by any suitable means in the chamber 1. Normally there is free access of air to the space 40, while the film closes the passages 13, so that each valve 4 is held in position closing its port 16. When one of the slots 14 registers with one of the passages 13 air flows into the corresponding recess 2, presses on diaphragm 3 which lifts the head 44 and raises the valve 4 to position closing port 16, opening port 41. An air suction being then established in the corresponding cylinder chamber 6, the piston 5 is raised, gear and pinion segments 7 and 32 are rotated and the cam-slide 22 connected thereto is moved inwardly, engaging one of the pins 9 and setting the slide 10 at the proper position to give the desired light opening in the iris, the parts later returning to normal position by gravity when the slot 14 moves out of registry with the passage 13, the slide 10 remaining in the position to which it was adjusted until the next slot 14 registers with one of the passages 13.

In Fig. 6 I have indicated a modified construction for the valve controllng the ports 16 and 41. In this arrangement the valve disk 4' has a pair of circular projections, 60 and 61 respectively, one on each side thereof which are of equal diameter to the said ports and are adapted to project thereinto, while the distance between their opposed faces equals the height of the space so that each port opens or closes at the instant the other one closes or opens.

As will be understood, the device will operate continuously without any resetting, each of the cam-slides 22 moving the index slide 10 from whatever position it previously occupied to its new position.

While I have here illustrated a preferred embodiment of the invention it is to be understood that the same is only illustrative of the principle employed and that widely varying changes might be made without departing from the spirit of the invention.

What I claim is as follows:

1. In a film printing machine, an iris, a movable element operatively connected thereto and adapted to be set in varying positions moving said iris according to the degree of light desired, and a series of individually operable members adapted to move said element from one position to another, and means controlled by the film for selectively operating said members.

2. In a film printing machine, light varying means including a movable element adapted to be set in varying positions according to the degree of light desired, a series of individually operable members having different motions and adapted to move said element from one position to another, and pneumatically operating means controlled by the film for selectively operating said members.

3. In a film printing machine, light varying means including a movable element adapted to be set in varying positions according to the degree of light desired, a series of individually operable members having different motions and adapted to move said element from one position to another, and pneumatically operating means controlled by the film for selectively operating said members, said last means including a part over which the film is adapted to pass and having a series of passages therethrough whose intake ends are normally covered by the film.

4. In a film printing machine, light varying means including a movable element adapted to be set in varying positions according to the degree of light desired, a series of individually operable members adapted to move said element from one position to another to regulate the degree of light, and pneumatically operating means controlled by the film for selectively operating said members, said last means including a part over which the film is adapted to pass and having a series of passages therethrough whose intake ends are normally covered by the film, a series of cylinders, pistons in said cylinders operatively connected to the respective members, a vacuum chamber, and means whereby on the intake ends of any of the said passages being opened, communication is established between the rear of the corresponding position and the said vacuum chamber.

5. In a film printing machine, light varying means including a movable element adapted to be set in varying positions according to the degree of light desired, a series of individually operable members adapted to move said element from one position to another to regulate the degree of light, and pneumatically operating means controlled by the film for selectively operating said members, said last means including a part over which the film is adapted to pass and having a series of passages therethrough whose intake ends are normally covered by the film, a series of cylinders, pistons in said cylinders operatively connected to the respective members, a vacuum chamber, and means whereby on the intake end of any of the said passages being opened, communication is established between the rear of the corresponding piston and the said vacuum chamber, said means including a valve normally closing a port leading from the cylinder to the vacuum chamber, an elastic diaphragm closing a second opening in the wall of the said vacuum chamber, a conduit leading from the said passage to the said diaphragm, and a headed valve stem adapted to be engaged by said diaphragm to lift the said valve from its closing position.

6. In a film printing machine, light varying means, an index slide operatively connected thereto, a series of cam-slides movable transversely to said index slide, and devices on said index slide adapted to be individually engaged by said cam-slides, said devices having different relative positions with respect to the cam-slides engaged thereby.

7. In a film printing machine, light varying means, a movable element operatively connected thereto, and adapted to operate said light varying means and a plurality of movable members adapted to separately engage and operate said element to set the same in different selected positions, said members normally resting out of operative relation to said element.

Signed at Brooklyn in the county of Kings and State of New York this 24th day of January A. D. 1921.

OTTO VOGETZER.